United States Patent
Nojima et al.

(10) Patent No.: US 7,256,155 B2
(45) Date of Patent: Aug. 14, 2007

(54) FLUE GAS DENITRATION CATALYST AND PREPARATION PROCESS THEREOF

(75) Inventors: Shigeru Nojima, Hiroshima-ken (JP); Kozo Iida, Hiroshima-ken (JP); Yoshiaki Obayashi, Hiroshima-ken (JP); Katsumi Nochi, Hiroshima-ken (JP); Masashi Kiyosawa, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 277 days.

(21) Appl. No.: 10/705,365

(22) Filed: Nov. 10, 2003

(65) Prior Publication Data

US 2004/0180783 A1  Sep. 16, 2004
US 2005/0054523 A9  Mar. 10, 2005

(30) Foreign Application Priority Data

Mar. 14, 2003 (JP) .............................. 2003-069105

(51) Int. Cl.
*B01J 23/00* (2006.01)
*B01J 21/00* (2006.01)

(52) U.S. Cl. .................. 502/312; 502/309; 502/350; 502/353; 502/439

(58) Field of Classification Search ................ 502/309, 502/312, 350, 353, 439
See application file for complete search history.

(56) References Cited

U.S. PATENT DOCUMENTS

| | | | | |
|---|---|---|---|---|
| 3,464,930 A | * | 9/1969 | Goehre et al. | 502/309 |
| 3,509,179 A | * | 4/1970 | Goehre et al. | 549/248 |
| 3,994,833 A | * | 11/1976 | Jouy et al. | 502/309 |
| 4,207,209 A | * | 6/1980 | Matsuda et al. | 502/304 |
| 4,466,947 A | * | 8/1984 | Imanari et al. | 423/239.1 |
| 4,520,124 A | * | 5/1985 | Abe et al. | 502/159 |
| 4,812,296 A | * | 3/1989 | Schmelz et al. | 423/239.1 |
| 4,833,113 A | * | 5/1989 | Imanari et al. | 502/309 |
| 4,849,392 A | * | 7/1989 | Hums et al. | 502/209 |
| 4,851,381 A | * | 7/1989 | Hums | 502/209 |
| 4,916,107 A | * | 4/1990 | Brand et al. | 502/309 |
| 4,929,586 A | * | 5/1990 | Hegedus et al. | 502/217 |

(Continued)

FOREIGN PATENT DOCUMENTS

JP  63134057  6/1988

*Primary Examiner*—Cam N. Nguyen
(74) *Attorney, Agent, or Firm*—Myers, Bigel, Sibley & Sajovec, P.A.

(57) ABSTRACT

Provided are a flue gas denitration catalyst having high denitration activity and capable of suppressing a side reaction, that is, oxidation of $SO_2$; and a preparation process of the catalyst. The flue gas denitration catalyst comprises $TiO_2$, $WO_3$ and $V_2O_5$. In the surface layer of the catalyst within 200 μm from the surface thereof, $V_2O_5$ is supported on a carrier containing $TiO_2$ and $WO_3$. The supported amounts of $V_2O_5$ range from 0.4 to 5 wt. % based on the weight of the surface layer and range from 0.1 to 0.9 wt. % based on the total weight of the catalyst. The $V_2O_5$ thus supported has a crystallite size of less than 10 nm as measured by X-ray diffraction. The catalyst can be available by preparing a mixture containing $TiO_2$ and $WO_3$ and having $V_2O_5$ supported on the surface of an extruded product of the prepared mixture by a vapor phase method. The catalyst can be also available by having $V_2O_5$ supported on a powder of the prepared mixture by a vapor phase method and having the resulting powder supported on the surface of a formed product.

10 Claims, 1 Drawing Sheet

U.S. PATENT DOCUMENTS

| | | | |
|---|---|---|---|
| 4,977,127 A * | 12/1990 | Rikimaru et al. | 502/309 |
| 5,004,718 A * | 4/1991 | Ishida et al. | 502/217 |
| 5,137,855 A * | 8/1992 | Hegedus et al. | 502/84 |
| 5,198,403 A * | 3/1993 | Brand et al. | 502/204 |
| 5,227,356 A * | 7/1993 | Hess et al. | 502/217 |
| 5,292,704 A * | 3/1994 | Lester | 502/309 |
| 5,300,472 A * | 4/1994 | Brand et al. | 502/309 |
| 5,397,545 A * | 3/1995 | Balling et al. | 422/171 |
| 5,582,809 A * | 12/1996 | Rikimaru et al. | 423/239.1 |
| 5,696,049 A * | 12/1997 | Ikeyama et al. | 502/350 |
| 5,723,404 A * | 3/1998 | Butje et al. | 502/350 |
| 5,753,582 A * | 5/1998 | Garcin et al. | 502/323 |
| 5,863,855 A * | 1/1999 | Nojima et al. | 502/309 |
| 5,869,419 A * | 2/1999 | Obayashi et al. | 502/305 |
| 6,054,408 A * | 4/2000 | Hums et al. | 502/217 |
| 6,120,747 A * | 9/2000 | Sugishima et al. | 423/240 S |
| 6,475,952 B2 * | 11/2002 | Fischer et al. | 502/353 |
| 6,576,585 B2 * | 6/2003 | Fischer et al. | 502/309 |
| 6,641,785 B1 * | 11/2003 | Neufert et al. | 422/177 |
| 6,803,340 B2 * | 10/2004 | Lee et al. | 502/309 |
| 2001/0025009 A1 * | 9/2001 | Fischer et al. | 502/242 |

* cited by examiner

FLUE GAS DENITRATION CATALYST AND PREPARATION PROCESS THEREOF

RELATED APPLICATION

This application claims priority from Japanese Patent Application No. 2003-069105 filed Mar. 14, 2003, the disclosure of which is incorporated by reference herein in its entirety.

BACKGROUND OF THE INVENTION

The present invention relates to a flue gas denitration catalyst for the removal of nitrogen oxides from a flue gas of a combustion furnace such as large-sized boiler for electricity generation; and a preparation process of the catalyst.

A flue gas from a boiler usually contains nitrogen oxides and sulfur oxides. One denitration method for such a flue gas is to add ammonia to the flue gas which passes over a catalyst composed mainly of titanium (Ti), tungsten (W), and vanadium (V) where nitrogen oxides are treated in accordance with the following reaction formula:

$$4NO+4NH_3+O_2 \rightarrow 4N_2+6H_2O$$

A flue gas denitration catalyst can ordinarily be prepared by forming, into a monolithic honeycomb shape, a powdery catalyst obtained by supporting tungsten trioxide ($WO_3$) and vanadium pentoxide ($V_2O_5$) on a carrier of titanium dioxide ($TiO_2$) by impregnation. This preparation process however involves such a problem that an increase in the amount of $V_2O_5$, which is a main active component of the catalyst, improves denitration activity but it simultaneously enhances oxidation of sulfur dioxide which is a reaction as shown in the below-described reaction formula:

$$2SO_2+O_2 \rightarrow 2SO_3.$$

There is therefore proposed a preparation process comprising forming a $TiO_2$ powder into a honeycomb carrier, supporting $WO_3$ on the resulting honeycomb carrier by an impregnation method and then supporting $V_2O_5$ on the resulting carrier by a vapor phase method (refer to Japanese Examined Patent Publication No. 6-40957). Compared with the conventional catalyst which is obtained by impregnation and whose $V_2O_5$ concentration is uniform even inside the bulk, the catalyst obtained by the above-described process can contain $V_2O_5$ thinly and uniformly along the surface of the catalyst at a high concentration so that it is possible to promote the denitration reaction which proceeds sufficiently in the surface layer of the catalyst alone and to prevent the oxidation of $SO_2$ occurring even inside the bulk.

Emission standards of nitrogen oxides are becoming more stringent, and flue gas denitration catalysts have to have higher denitration performance. In addition, in the denitration method employed particularly for the exhaust gas from a coal-fired boiler among various exhaust gases, catalysts capable of suppressing oxidation of $SO_2$ which is a side reaction and having high denitration activity are required. Moreover, in the method as described in the above patent publication, it is difficult to form $TiO_2$ into a monolithic honeycomb, because upon its formation, even if various binders are added to $TiO_2$, they fail to give sufficient strength to the $TiO_2$ carrier.

SUMMARY OF THE INVENTION

In light of above-described problems, an object of the present invention is therefore to provide a flue gas denitration catalyst which has high denitration activity and is capable of suppressing the oxidation of $SO_2$ which is a side reaction; and a preparation process of such a catalyst.

For satisfying the above-described object, a preparation process of a flue gas denitration catalyst according to the present invention comprises preparing a mixture containing titanium dioxide and tungsten trioxide, and having vanadium pentoxide supported on the surface of an extruded catalyst body or on a powder of the prepared mixture using a vapor phase method.

Extrusion of the mixture obtained by adding $WO_3$ to $TiO_2$ increases adhesion, thereby improving the denitration activity. By adopting a vapor phase approach, $V_2O_5$ can be supported on the surface of the extruded catalyst body thinly and uniformly at a high concentration so that the oxidation of $SO_2$ can be suppressed. Moreover, the addition of $WO_3$ improves lubrication upon extrusion of the mixture and also compression strength of the extruded catalyst body.

Alternatively, with $V_2O_5$ being supported on the powder of a $TiO_2$ and $WO_3$ mixture, adhesion between $TiO_2$ and $WO_3$ is increased, making it possible to improve the denitration activity of the catalyst. Further, by having the resulting powder supported on the surface of a formed product, $V_2O_5$ exists only on the surface and the oxidation of $SO_2$ can be suppressed. In such systems, a boiling bed type (ebullient bed type) or a moving bed type (fluidized bed type) is preferably employed for the vapor phase method.

In the preparation process of a flue gas denitration catalyst according to the present invention, titanium dioxide and tungsten trioxide in the mixture preferably exist as a complex oxide thereof. The vanadium source in the vapor phase method is preferably at least one compound selected from vanadium oxytrichloride, vanadium oxytribromide, vanadium pentachloride and vanadium dichloride. The above-described mixture further preferably contains silicon dioxide. Titanium dioxide, tungsten trioxide and silicon dioxide in the above-described mixture preferably exist as a complex oxide thereof.

In another aspect of the present invention, there is also provided a flue gas denitration catalyst available by preparing a mixture containing titanium dioxide and tungsten trioxide, and having vanadium pentoxide supported on the surface of an extruded catalyst body or on a powder of the prepared mixture using a vapor phase method. In addition, there is also provided a flue gas denitration catalyst available by further having the resulting powder supported on the surface of a formed product. The formed product preferably contains titanium dioxide, tungsten trioxide and vanadium pentoxide.

In the flue gas denitration catalyst of the present invention, titanium dioxide and tungsten trioxide in the above-described mixture preferably exist as a complex compound thereof. The amounts of vanadium pentoxide range preferably from 0.4 to 5 wt. % based on the surface layer of the denitration catalyst which has a thickness of 200 μm from its surface, and range from 0.1 to 0.9 wt. % based on the total weight of the catalyst. The crystallite size of the vanadium pentoxide supported by the vapor phase method is preferably less than 10 nm as measured by X-ray diffraction. The extruded catalyst body and the formed product have preferably a honeycomb shape. The above-described mixture preferably contains silicon dioxide. Titanium dioxide, tungsten trioxide and silicon dioxide in the above-described mixture preferably exist as a complex oxide thereof.

In a still further aspect of the present invention, there is also provided a flue gas denitration catalyst comprising titanium dioxide, tungsten trioxide and vanadium pentoxide, wherein the vanadium pentoxide is supported on a carrier containing titanium dioxide and tungsten trioxide in the surface layer of the catalyst which has a thickness of 200 μm from its surface; wherein the amounts of vanadium pentoxide range from 0.4 to 5 wt. % based on the weight of the surface layer, and range from 0.1 to 0.9 wt. % based on the total weight of the catalyst; and wherein the vanadium pentoxide on the carrier has a crystallite size of less than 10 nm as measured by X-ray diffraction.

DETAILED DESCRIPTION OF THE PREFERRED EMBODIMENT

Figure 1:
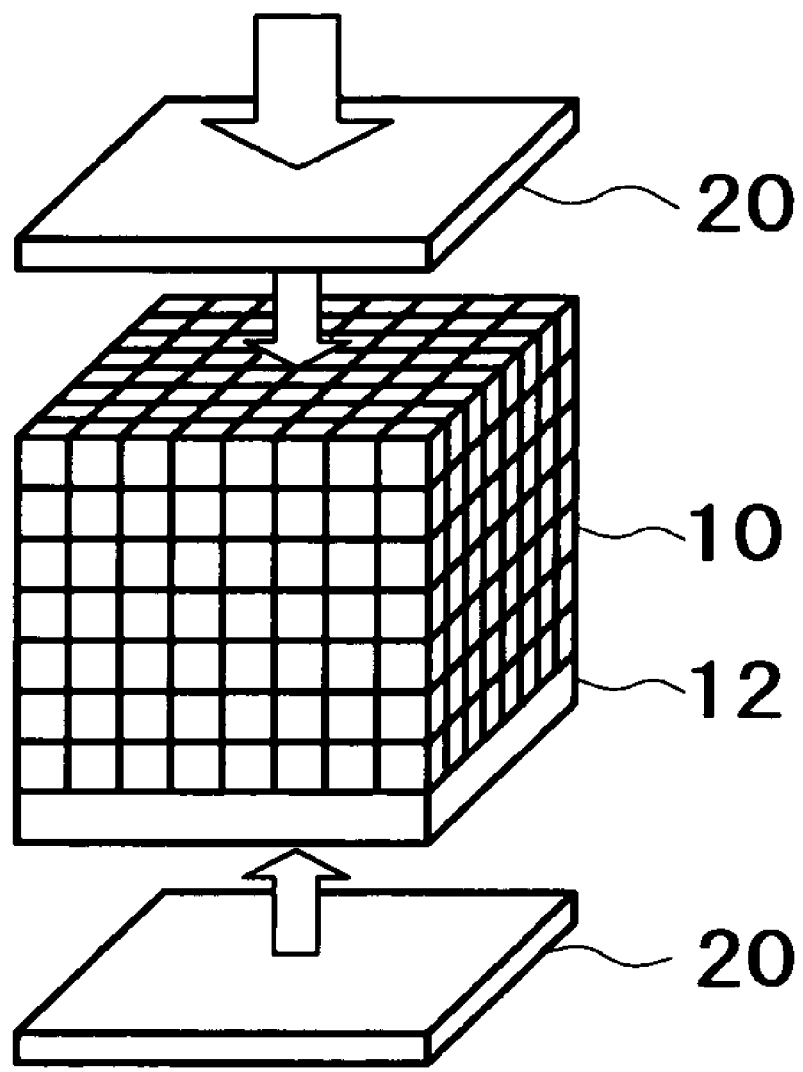
FIG. 1 is a schematic view illustrating the measuring method of crushing strength.

The embodiments of the present invention will next be described.

First Embodiment

A preparation process of a flue gas denitration catalyst according to a first embodiment of the present invention comprises extruding a mixture containing $TiO_2$ and $WO_3$, and having $V_2O_5$ supported on the surface of the extruded catalyst body using a vapor phase method.

As the mixture containing $TiO_2$ and $WO_3$, a kneaded mixture of $TiO_2$ and $WO_3$ or a complex oxide of $TiO_2$ and $WO_3$ may be used. Use of a complex oxide of $TiO_2$ and $WO_3$ is particularly preferred, because it promotes denitration reactions, suppresses oxidation $SO_2$ and facilitates extrusion into a honeycomb catalyst. The $TiO_2:WO_3$ ratio by weight preferably ranges from 100:5 to 100:20, more preferably from 100:6 to 100:18. Adjustment to such a ratio not only suppresses the oxidation of $SO_2$ but also improves an extrusion property into a monolithic honeycomb catalyst.

The further addition of $SiO_2$ to the mixture is preferred. Addition of $SiO_2$ increases the amount of a solid acid in the catalyst. An increase in the amount of a solid acid not only improves an adsorption rate of $NH_3$ but also makes it possible to suppress adsorption of $SO_2$, so as to suppress the oxidation of $SO_2$ which is a side reaction. When $SiO_2$ is added, it is preferably added in the form of a complex oxide of $TiO_2$, $SiO_2$ and $WO_3$, because if so, the denitration is promoted, the oxidation of $SO_2$ is suppressed and the extrusion property into a honeycomb catalyst can be improved. The $TiO_2:SiO_2$ ratio by weight preferably ranges from 100:1 to 100:15, more preferably from 100:3 to 100:10. By adjusting to a ratio within the above-described range, the resulting catalyst is capable of exhibiting the above-described properties. Various binders can be added to the mixture in order to facilitate extrusion.

No particular limitation is imposed on how the mixture is extruded and known extruders can be used. The extruded catalyst body thus obtained preferably has a monolithic honeycomb shape. The term "honeycomb shape" as used herein means not only regular hexagons in its cross-section but also squares. By forming the catalyst into a honeycomb shape, a specific surface area of the extruded catalyst body increases, leading to an improvement in the denitration performance.

As a method for having $V_2O_5$ supported on the surface of the extruded catalyst body by the vapor phase method, a fixed bed system is preferred. For example, usable is a method of blowing a vanadium source, together with a carrier gas, into a reaction furnace set at high temperatures and feeding the surface of the extruded catalyst body with a vanadium vapor. As the vanadium source, vanadium oxytrichloride ($VOCl_3$), vanadium oxytribromide ($VOBr_3$), vanadium pentachloride ($VCl_5$) and vanadium dichloride ($VCl_2$) are preferred. Such vanadium sources are in the liquid or solid form at normal temperatures, but by converting them into the vapor phase, a vanadium component can be supported on the surface of the extruded catalyst body.

When $VOCl_3$ is employed as the vanadium source, it reacts with the hydroxyl group (—OH) on the surface of $TiO_2$ to form —$OVOCl_2$ thereon. Then, the Cl is removed therefrom by calcination or hydrolysis, and —$OVO(OH)_2$ is formed. When the —$OVO(OH)_2$ formed in the surface of the catalyst is calcined, a monomolecular layer of $V_2O_5$ can be formed uniformly. Thus, $V_2O_5$ can be uniformly supported mainly on the surface of the extruded catalyst body by the vapor phase method.

The flue gas denitration catalyst thus obtained has $V_2O_5$ mainly on the surface layer of the extruded catalyst body at a high concentration, and has little $V_2O_5$ inside the bulk of the extruded catalyst body. It is therefore possible to promote the denitration reaction which proceeds sufficiently only in the surface layer of the extruded catalyst body and at the same time, to suppress the oxidation of $SO_2$ which occurs also inside the bulk of the extruded catalyst body.

The amounts of $V_2O_5$ preferably range from 0.4 to 5 wt. % based on the weight of the surface layer of the flue gas denitration catalyst which has a thickness of 200 μm from its surface and range from 0.1 to 0.9 wt. % based on the total weight of the catalyst. Since the amount of $V_2O_5$ is 0.4 wt. % or greater based on the surface layer, the catalyst is capable of exhibiting high denitration activity. Since the amount is 5 wt. % or less, the oxidation of $SO_2$ in the surface layer can be suppressed completely. The amount of $V_2O_5$ based on the total weight of the catalyst is 0.1 wt. % or greater so that predetermined denitration performance is exhibited even if the supported amount of vanadium in the surface layer is not uniform. The amount is 0.9 wt. % or less so that the oxidation of $SO_2$ inside the bulk can be suppressed completely. The supported amounts of $V_2O_5$ more preferably range from 0.4 to 3 wt. % based on the weight of the surface layer and range from 0.1 to 0.3 wt. % based on the total weight of the catalyst.

The $V_2O_5$ supported by the vapor phase method is finely pulverized so that it has high denitration activity compared with $V_2O_5$ supported by conventional impregnation. The $V_2O_5$ preferably has a crystallite size of less than 10 nm as measured by X-ray diffraction. Adjustment of the crystallite size of $V_2O_5$ to less than 10 nm enables a drastic improvement in its denitration activity. The crystallite size of $V_2O_5$ is more preferably 8 nm or less as measured by X-ray diffraction.

Second Embodiment

A preparation process of a flue gas denitration catalyst according to the second embodiment of the present invention comprises having $V_2O_5$ supported on a powder mixture containing $TiO_2$ and $WO_3$ by a vapor phase method, and having the resulting powder supported on the surface of a formed product.

As the powder mixture containing $TiO_2$ and $WO_3$, a mixture of $TiO_2$ powder and $WO_3$ powder or a complex oxide powder of $TiO_2$ and $WO_3$ is usable. The complex oxide powder of $TiO_2$ and $WO_3$ is particularly preferred. Addition of $SiO_2$ to the powder mixture is also preferred as in the first embodiment, of which use of a complex oxide powder of $TiO_2$, $SiO_2$ and $SO_3$ is more preferred. A weight ratio of powders constituting the mixture is similar to that used in the first embodiment. Although no particular limitation is imposed on the average particle size of the powder, a range of from 0.1 μm to 30 μm is preferred.

In a similar manner to that employed in the first embodiment, $V_2O_5$ can be supported on the powder by a vapor phase method. As well as the fixed bed system, a boiling bed system or a moving bed system can be adopted. Use of the boiling bed system or moving bed system enables continuous supporting of $V_2O_5$, so that $V_2O_5$ can be supported efficiently to a large amount of powders.

The $V_2O_5$ supported powder is supported on the surface of a formed product, for example, by converting the powder into a slurry, applying the slurry to the surface of the formed product and then drying. Although no particular limitation is imposed on the formed product insofar as it permits stable supporting of the $V_2O_5$ supported powder on a carrier made of $TiO_2$ and $WO_3$ for a long period of time, the formed product composed mainly of $TiO_2$ is preferred, of which the formed product composed of $TiO_2$ and $WO_3$ and optionally $V_2O_5$ is more preferred, with the formed product having $WO_3$ and $V_2O_5$ supported thereon by impregnation being still more preferred. The formed product is preferably obtained in the monolithic honeycomb form by extrusion.

The flue gas denitration catalyst thus obtained has $V_2O_5$ on the surface of the formed product at a high concentration, but has little $V_2O_5$ inside the bulk of the formed product so that the denitration reaction which proceeds sufficiently only in the surface layer of the catalyst can be accelerated and at the same time, the oxidation of $SO_2$ also inside the bulk of the catalyst can be suppressed.

Similar to the flue gas denitration catalyst available according to the first embodiment, the catalyst of the second embodiment preferably has $V_2O_5$ supported thereon in an amount of from 0.4 to 5 wt. % based on the surface layer of the catalyst which has a thickness of 200 μm from its surface and in an amount of from 0.1 to 0.9 wt. % based on the total weight of the catalyst, of which amounts of from 0.4 to 3 wt. % based on the surface layer and from 0.1 to 0.3 wt. % based on the whole catalyst are more preferred, respectively. The $V_2O_5$ supported in accordance with the vapor phase method is in the finely pulverized form as in the first embodiment. The crystallite size of $V_2O_5$ is preferably less than 10 nm as measured by X-ray diffraction, with 8 nm or less being more preferred.

EXAMPLES

The present invention will be explained in more detail by way of examples, which are not intended to be limiting of the present invention.

Preparation of Catalyst

Example 1

An aqueous $TiOSO_4$ solution (1500 g) having a concentration of 15% in terms of $TiO_2$ was cooled to 20° C. or less. Then, the resulting solution was neutralized to pH 8 by adding 15% aqueous ammonia in portions. The titanium hydroxide precipitate thus obtained was washed with water and collected by filtration, whereby titanium hydroxide in the paste form was obtained. Ammonium paratungstate was added to the resulting titanium hydroxide paste (at a $TiO_2$: $WO_3$ ratio by weight of 10:1), followed by sufficient kneading and mixing. The kneaded mass was dried, and calcined at 500° C. for 5 hours, whereby a $TiO_2$—$WO_3$ complex oxide was obtained.

To 95 parts by weight of the complex oxide were added 5 parts by weight of glass fibers and 10 parts by weight of an organic binder (cellulose acetate). After the addition of water and sufficient mixing in a kneader, the reaction mixture was adjusted to have an adequate water concentration. The holes of a honeycomb extruder were adjusted to squares and the mixture was extruded into a honeycomb shape having an opening of 6.0 mm and a wall thickness of 1.0 mm. The extruded product was dried, and calcined at 500° C. for 3 hours.

The resulting calcined honeycomb was placed in a reaction furnace having a constant temperature of 400° C., followed by blowing thereinto $VOCl_3$, a compound which takes a liquid form at normal temperature, at 40 ml/min, while using $N_2$ as a carrier gas. The calcined honeycomb was then fed for 20 minutes with the $VOCl_3$ vapor generated by a fixed bed system. After the resulting calcined product was taken out from the reaction furnace, it was calcined for 3 hours in the air, whereby a honeycomb catalyst (Example 1) was obtained.

The $V_2O_5$ distribution of this honeycomb catalyst was analyzed by an X-ray microanalyzer. The supported amounts of $V_2O_5$ were 0.90 wt. % based on the surface layer within 200 μm from the surface of the honeycomb catalyst and 0.28 wt. % based on the total weight of the catalyst including also the inside of the bulk.

Examples 2 to 4

In a similar manner to that employed in Example 1 except the use of $VOBr_3$, $VCl_5$ and $VCl_2$, instead of $VOCl_3$ as the vanadium source, honeycomb catalysts (Examples 2 to 4) were obtained, respectively. As a result, in Examples 2 to 4, the supported amounts of $V_2O_5$ were 0.84 wt. %, 0.92 wt. % and 0.83% based on the surface layer of the honeycomb catalyst; and 0.22%, 0.19 wt. % and 0.18 wt. % based on the whole catalyst, respectively.

Example 5

After a $TiO_2$—$WO_3$ complex oxide was obtained as in Example 1, it was pulverized into a powdery complex oxide. The resulting powder (200 g) was filled in a boiling bed reactor (80 mm in diameter quartz cylindrical tube) and was confirmed to be boiled uniformly by an upflow. $VOCl_3$ was added to an $N_2$ gas heated to 400° C. and the resulting mixture was supplied to the filled layer from the downstream toward the upstream at 100 cc/min for 20 minutes. The resulting vanadium-supported powder was calcined in the air at 500° C. for 3 hours. The resulting powder was found to have 0.65 wt. % of $V_2O_5$ uniformly. The powder thus obtained was designated as "powder catalyst (a)".

A preparation process of honeycomb catalyst (c) to be used as a base material will next be described.

First, titanium hydroxide in the paste form was obtained in a similar manner to that employed in Example 1. It was then dried and calcined at 500° C. for 5 hours, and a $TiO_2$ powder was prepared. The $TiO_2$ powder thus obtained was extruded in a similar manner to that employed in Example 1, whereby a honeycomb $TiO_2$ having an opening of 6.0 mm and a wall thickness of 1.0 mm was obtained. The resulting honeycomb $TiO_2$ was impregnated with an aqueous solution of ammonium paratungstate, followed by drying and subsequent calcination at 500° C. for 3 hours. The resulting honeycomb of $WO_3$-supporting $TiO_2$ was impregnated with an aqueous solution of ammonium metavanadate, followed by drying and subsequent calcination at 500° C. for 3 hours, and denitration catalyst (c) in the honeycomb form was obtained. Denitration catalyst (c) was composed of $TiO_2$, $WO_3$ and $V_2O_5$ at a ratio by weight of 91:8.9:0.1.

Powder catalyst (a) was supported on the honeycomb denitration catalyst (c) serving as a base material in the following manner. Water was added to powder catalyst (a) and the mixture was converted in a slurry in a wet ball mill. Powder catalyst (a) was applied to the surface of denitration catalyst (c) to give 100 g/cm² per surface area of denitration catalyst (c). After drying the catalyst thus applied, it was calcined at 500° C. for 3 hours, whereby a honeycomb catalyst (Example 5) was obtained.

Example 6

A moving bed reactor (a cylindrical tube of 60 mm in diameter, moved while rotating at 10 cm/min) was filled with 200 g of a powdery complex oxide obtained in a similar manner to that employed in Example 5. $VOCl_3$ was added to an $N_2$ gas heated to 400° C. and the mixture was fed to a reactor for 20 minutes. The vanadium-supporting powder thus obtained was calcined at 500° C. for 3 hours. It was found that on the resulting powder, 0.69 wt. % of $V_2O_5$ was supported uniformly. The $V_2O_5$-supporting powder thus obtained was designated as powder catalyst (b). Powder catalyst (b) was applied to denitration catalyst (c) in a similar manner to that employed in Example 5. After drying, the catalyst thus applied was calcined at 500° C. for 3 hours, whereby a honeycomb catalyst (Example 6) was obtained.

Examples 7 and 8

In a similar manner to Example 1 except that the $VOCl_3$ vapor was fed for 15 minutes and 30 minutes instead of 20 minutes, honeycomb catalysts (Examples 7 and 8) were obtained, respectively. In Examples 7 and 8, the supported amounts of $V_2O_5$ were 0.75 wt. % and 0.98 wt. % based on the surface layer of the honeycomb catalysts; and 0.23 wt. % and 0.32 wt. % based on the whole catalysts, respectively.

Example 9

In a similar manner to Example 1 except that instead of preparation of a $TiO_2$—$WO_3$ complex oxide, a $TiO_2$—$SiO_2$—$WO_3$ complex oxide was prepared by adding silica sol ("Snowtex O", trade name) to a titanium hydroxide paste at a T:Si ratio by weight of 10:1, a honeycomb catalyst (Example 9) was obtained. The supported amounts of $V_2O_5$ were 0.80 wt. % based on the surface layer of the honeycomb catalyst and 0.24 wt. % based on the whole catalyst, respectively.

Example 10

In a similar manner to Example 1, titanium hydroxide was obtained in the paste form. The resulting titanium hydroxide paste was dried, and then calcined at 500° C. for 5 hours, and a $TiO_2$ powder was prepared. In a similar manner to Example 1, the resulting $TiO_2$ was extruded into a honeycomb shape. After measuring the saturated water content of the resulting honeycomb $TiO_2$, it was impregnated with an aqueous solution of ammonium paratungstate to support ammonium paratungstate on the honeycomb $TiO_2$ to give a $TiO_2$:$WO_3$ ratio by weight of 10:1. The impregnation was followed by drying and calcining at 500° C. for 3 hours, whereby $WO_3$ was supported. The honeycomb $WO_3$-supporting $TiO_2$ thus obtained was then impregnated with an aqueous solution of ammonium metavanadate. After drying, the resulting product was calcined at 500° C. for 3 hours. As a result of the analysis of the distribution condition of $V_2O_5$ in the resulting honeycomb catalyst (Example 10), it was found that $V_2O_5$ was supported uniformly in the catalyst from the surface to the inside of the bulk. The supported amounts of $V_2O_5$ based on the surface layer and the whole catalyst were both 0.29 wt. %.

Denitration Performance Test

The honeycomb catalysts obtained in Examples 1 to 10 were subjected to a denitration performance test under the below-described conditions. The test results (denitration ratio, $SO_2$ oxidation ratio) after treatment of a gas with these catalysts for 50 hours are shown in Table 1.

Shape of catalyst: honeycomb shape (volume: 2.5 L) of 5 cm×5 cm×100 cm

Gas flow rate: 25 Nm³/h (GHSV 10,000 h⁻¹)

Temperature: 350° C., 420° C.

molar ratio $NH_3$/NO: 1

Gas composition: NO: 200 ppm, $NH_3$: 200 ppm, $SO_2$:800 ppm, $O_2$: 4%, $CO_2$: 12%, $H_2O$: 10%, $N_2$: balance Measurement of Crystallite Size of $V_2O_5$ The crystallite size of $V_2O_5$ supported on each of the honeycomb catalysts obtained in Examples 1 to 10 was determined in accordance with the Scherrer equation based on data obtained by the X-ray diffraction method. The results of the measurement are also shown in Table 1.

Measurement of Crushing Strength of Honeycomb Catalysts

Crushing strength was measured in accordance with the below-described method in order to find the strength of the honeycomb shape of each of the honeycomb catalysts obtained in Examples 1 to 10. The results are also shown in Table 1. For the measurement, a tensile/compression tester ("THK-TK18", trade name; product of Tokyokoki Seizosho Ltd.) was employed.

(1) As illustrated in FIG. 1, a honeycomb catalyst 10 including the outside wall 12 was cut into a cube (5 cm×5 cm×5 cm).

(2) The honeycomb 10 was covered at upper and lower surfaces thereof with two cowl 20 (1 cm thick) a little wider than the surface of the honeycomb catalyst 10 and then packed in a vinyl bag.

(3) A primary crush value (kg) was measured by a tensile/compression tester.

(4) Crushing strength (kg/cm²) per unit area was calculated.

TABLE 1

| | | Active component (V$_2$O$_5$) | | | Denitration ratio [%] | | SO$_2$ oxidation ratio [%] | | Crushing strength [kg/cm$^2$] |
|---|---|---|---|---|---|---|---|---|---|
| | | Supported amount [wt. %] | | | | | | | |
| | Carrier | Supporting method (system) | Surface layer | Whole catalyst | Crystallite size [nm] | 350° C. | 420° C. | 350° C. | 420° C. | |
| Example 1 | TiO$_2$•WO$_3$ | Vapor phase (fixed bed) | 0.90 | 0.28 | 3 | 85 | 88 | 0.4 | 0.6 | 6.0 |
| Example 2 | TiO$_2$•WO$_3$ | Vapor phase (fixed bed) | 0.84 | 0.22 | 4 | 85 | 89 | 0.3 | 0.7 | 5.5 |
| Example 3 | TiO$_2$•WO$_3$ | Vapor phase (fixed bed) | 0.92 | 0.19 | 4 | 82 | 90 | 0.4 | 0.6 | 6.5 |
| Example 4 | TiO$_2$•WO$_3$ | Vapor phase (fixed bed) | 0.83 | 0.18 | 3 | 81 | 91 | 0.5 | 0.7 | 6.0 |
| Example 5 | TiO$_2$•WO$_3$ | Vapor phase (boiling bed) | 0.65 | 0.10 | 4 | 83 | 93 | 0.4 | 0.7 | 6.0 |
| Example 6 | TiO$_2$•WO$_3$ | Vapor phase (moving bed) | 0.69 | 0.10 | 3 | 84 | 90 | 0.4 | 0.8 | 7.0 |
| Example 7 | TiO$_2$WO$_3$ | Vapor phase (fixed bed) | 0.75 | 0.23 | 3 | 86 | 90 | 0.4 | 0.7 | 7.5 |
| Example 8 | TiO$_2$•WO$_3$ | Vapor phase (fixed bed) | 0.98 | 0.32 | 3 | 87 | 89 | 0.5 | 0.7 | 7.0 |
| Example 9 | TiO$_2$•SiO$_2$•WO$_3$ | Vapor phase (fixed bed) | 0.80 | 0.24 | 4 | 86 | 88 | 0.4 | 0.6 | 6.5 |
| Example 10 | TiO$_2$ | Impregnation | 0.29 | 0.29 | 10 | 78 | 77 | 1.0 | 2.0 | 3.5 |

As illustrated in Table 1, the honeycomb catalysts obtained in Examples 1 to 9 in which the supported amount of V$_2$O$_5$ based on the surface layer of each catalyst within 200 μm from its surface was as high as about 0.6 to 1.0 wt. % and V$_2$O$_5$ was finely pulverized with a crystallite size of 4 nm or less exhibited a denitration ratio as high as about 80 to 95%. The supported amount of V$_2$O$_5$ based on the whole catalyst including the inside of the bulk was as low as about 0.1 to 0.35 wt. %, making it possible to suppress an SO$_2$ oxidation ratio to as low as 0.3 to 0.8%. The honeycomb catalyst obtained in Example 10 in which the supported amounts of V$_2$O$_5$ based on the surface layer and based on the whole catalyst were both 0.29% and had a crystallite size as large as 10 nm exhibited a denitration ratio of less than 80% and an SO$_2$ oxidation ratio of 1.0% or greater. Thus, the desired performance was not attained by Example 10.

As illustrated in Table 1, the honeycomb catalysts of Examples 1 to 4 and 7 to 9 obtained by extruding a mixture of TiO$_2$ and WO$_3$, and optionally SiO$_2$ into a honeycomb shape exhibited excellent crushing strength of from 5.5 to 7.5 kg/cm$^2$. The honeycomb catalyst of Example 10 obtained by extrusion of only TiO$_2$ exhibited crushing strength of 3.5 kg/cm$^2$ and the desired crushing strength was not attained.

What is claimed is:

1. A flue gas denitration catalyst comprising vanadium pentoxide supported on a carrier containing titanium dioxide and tungsten trioxide, which is obtained by preparing a mixture containing titanium dioxide and tungsten trioxide, and then supporting vanadium pentoxide on the surface of an extruded catalyst body or on a powder of the prepared mixture using a vapor phase method, wherein the vanadium pentoxide has a crystallite size of 8 nm or less as measured by X-ray diffraction.

2. The flue gas denitration catalyst of claim 1, which is obtained by supporting vanadium pentoxide on a powder of the prepared mixture using a vapor phase method, and by further supporting said powder on the surface of another formed product.

3. The flue gas denitration catalyst of claim 2, wherein the formed product has a honeycomb shape.

4. The flue gas denitration catalyst of claim 2, wherein the formed product contains titanium dioxide, tungsten trioxide and vanadium pentoxide.

5. The flue gas denitration catalyst of claim 1, wherein titanium dioxide and tungsten trioxide in the mixture exists in the form of a complex oxide thereof.

6. The flue gas denitration catalyst of claim 1, wherein the supported amounts of vanadium pentoxide range from 0.4 to 5 wt. % based on the weight of a surface layer of the catalyst, which has a thickness of 200 μm from its surface, and range from 0.1 to 0.9 wt. % based on the total weight of the catalyst.

7. The flue gas denitration catalyst of claim 1, wherein the extruded catalyst body has a honeycomb shape.

8. The flue gas denitration catalyst of claim 1, wherein the mixture further contains silicon dioxide.

9. The flue gas denitration catalyst of claim 8, wherein titanium dioxide, tungsten trioxide and silicon dioxide in the mixture exists in the form of a complex oxide thereof.

10. A flue gas denitration catalyst comprising titanium dioxide, tungsten trioxide and vanadium pentoxide, wherein vanadium pentoxide is supported on a carrier containing titanium dioxide and tungsten trioxide in a surface layer of the catalyst, which has a thickness of 200 μm from its surface, wherein the supported amounts of vanadium pentoxide range from 0.4 to 5 wt. % based on the weight of the surface layer and range from 0.1 to 0.9 wt. % based on the total weight of the catalyst, and wherein vanadium pentoxide thus supported has a crystallite size of less than 8 nm as measured by X-ray diffraction.

* * * * *

UNITED STATES PATENT AND TRADEMARK OFFICE
CERTIFICATE OF CORRECTION

| | |
|---|---|
| PATENT NO. | : 7,256,155 B2 |
| APPLICATION NO. | : 10/705365 |
| DATED | : August 14, 2007 |
| INVENTOR(S) | : Nojima et al. |

It is certified that error appears in the above-identified patent and that said Letters Patent is hereby corrected as shown below:

Title Page;

Item (12): Please correct title as amended October 20, 2005 to read
-- Flue Gas Denitration Catalyst--

Signed and Sealed this

Twentieth Day of November, 2007

JON W. DUDAS
*Director of the United States Patent and Trademark Office*